United States Patent [19]

Kurokawa et al.

[11] Patent Number: 5,546,092
[45] Date of Patent: Aug. 13, 1996

[54] GPS RECEIVER

[75] Inventors: Takayuki Kurokawa; Atsushi Saitoh; Shigemasa Matsubara; Masayoshi Nawa; Kazuo Kobayashi, all of Atsugi, Japan

[73] Assignee: Mitsumi Electric Co., Ltd., Kanagawa, Japan

[21] Appl. No.: 404,363

[22] Filed: Mar. 15, 1995

[30] Foreign Application Priority Data

Mar. 16, 1994 [JP] Japan .................................. 6-046095

[51] Int. Cl.$^6$ .............................. H04B 7/185; G01S 5/02
[52] U.S. Cl. ........................ 342/357; 342/419; 340/988
[58] Field of Search .................................... 342/357, 419; 364/449, 444; 340/988

[56] References Cited

U.S. PATENT DOCUMENTS 5,075,693  12/1991  McMillan et al. ...................... 342/457
5,146,231   9/1992  Ghaem et al. .......................... 342/419
5,422,814   6/1995  Sprague et al. ........................ 364/449

FOREIGN PATENT DOCUMENTS 5-72315    3/1993  Japan .
5-119146   5/1993  Japan .

Primary Examiner—Theodore M. Blum
Attorney, Agent, or Firm—Hill, Steadman & Simpson

[57] ABSTRACT

A GPS receiver displays information concerning a distance to a destination and a direction with respect to the destination and the like. The information is provided according to a preset operating condition on the basis of data which include position data of the destination which is set in advance and position data of the current position which is obtained from radio waves emitted from GPS satellites orbiting the earth. The GPS receiver includes a memory which stores data of operating conditions corresponding to first, second, third and fourth operation modes. The parameters of the operating conditions of the four operation modes are different from each other in at least a part thereof. The receiver further includes a mode selection section for selecting either one of the operation modes suitable for the actual use of the GPS receiver, an operating section for operating the mode selection section, and a display for displaying various information including information relating to navigation on the basis of the data corresponding to the operating condition of the selected operation mode.

9 Claims, 5 Drawing Sheets

FIG.3

SETUP MENU

| Menu | Contents | Initial Settings ||||
|---|---|---|---|---|---|
| | | Marine Mode | Driving Mode | Cycling Mode | Mountain Mode |
| Datum | Selection from 7 types of geodestic systems | WGS84 | WGS84 | WGS84 | WGS84 |
| Coordinate Style | Coordinate Display Style | Minutes | Second | Second | Second |
| GPS Mode | 2D/3D/Auto | 2D | Auto | Auto | Auto |
| Antenna Height | Setting Height of Antenna | 0ft | --- | --- | --- |
| Time Difference | Setting Local Time | UTC+00h | UTC+00h | UTC+00h | UTC+00h |
| Way Point Zone | Zone Considered to be Arrival at the Destination | 1.0 | 1.0 | 0.5 | 0.1 |
| Disp. Units | Units of Distance | nm | km | km | km |
| Direction | Formats of Indicating Direction | Angles | East-West-South-North | East-West-South-North | East-West-South-North |
| Power Save | Method of Power Saving | Continuous | Continuous | Continuous | Continuous |
| Position Set | Setting Current Position | NO EO | NO EO | NO EO | NO EO |

※ Units for speed are determined on the Units of Distance.
※ ▨ : No Changes Permitted   ☐ : Changes Permitted

GPS RECEIVER

BACKGROUND OF THE INVENTION

1. Field of the Invention

The present invention relates to a global positioning system (hereinafter, referred to as "GPS") receiver, and in particular relates to a GPS receiver having improved operability.

2. Description of the Background Art

In GPS receivers, position data of a destination is preset, and three dimensional position data of an operator's current position is obtained from radio waves emitted from GPS satellites Orbiting the earth. On the basis of these position data, information concerning the distance to the destination and direction with respect to the destination or the like is obtained, and then thus-obtained information is displayed for guiding or navigating the operator to the destination according to the displayed information. Among these GPS receivers as described above, there are portable GPS receivers. Such portable GPS receivers are used for a wide range of activities, examples of which include marine sports such as yachting and fishing, outdoor sports such as mountain climbing and mountain biking, and sky sports such as hang-gliding and hot air ballooning.

Now, when a GPS receiver is used for the activities mentioned above, the GPS receiver must use different units or formats for representing distances and directions appropriately for each of such activities. Namely, when a GPS receiver is used for driving or touring, distance should be indicated in kilometers (or miles) and direction should be indicated with respect to the north, south, east and west directions, but when the GPS receiver is used for marine sports, distance should be indicated in nautical miles and direction should be indicated in degrees. Furthermore, when the GPS receiver is used on the sea for marine sports, it is unnecessary for the GPS receiver to display data representing height or altitude. Further, in this case, coordinates for specifying a position only need an accuracy in units of minutes, while land use requires an accuracy in units of seconds.

With the conventional GPS receivers, an operator must previously set operating condition by setting the units and format for representing distance and direction so as to meet with expected use, and then the GPS receiver displays distance and direction according to the thus-set operating condition. For this reason, each time when the using conditions for the GPS receiver change during use, the units and format for the GPS receiver need to be changed in each change of the using conditions. For example, when an operator reaches a seaside by vehicle such as automobile, cruises by boat, and then travels by automobile again, the units and format for the GPS receiver need to be changed in each travel. However, with the conventional GPS receivers, only one operating condition setting for one operation mode is possible, and for this reason an effective display is possible only for the actual using condition that matches such operation mode of the GPS receiver. Accordingly, it is necessary to reset the operating condition of the conventional GPS receivers each time when the using conditions change.

Furthermore, operation of the conventional GPS receivers is a very time-consuming process because each parameter of the operating condition must be changed or confirmed manually one at a time. Moreover, as the operations required to set the parameters of the operating condition of such GPS receivers are extremely complex, mistakes are likely to be caused while setting the operating condition.

SUMMARY OF THE INVENTION

The present invention has been made in view of the above mentioned problems. Therefore, the object of the present invention is to provide a GPS receiver in which the parameters of the operating condition can be changed easily and reliably in accordance with the change of the using conditions of the GPS receiver.

In order to achieve the above object, a GPS receiver according to the present invention comprises memory means which stores data of different operating conditions corresponding to at least two operation modes, in which the operating condition of one mode is different from the operating condition of the other mode in at least a part thereof; mode selection means for selecting an operation mode suitable for the using condition of the GPS receiver from the at least two modes stored in the memory means; and display means for displaying various information including information relating to navigation on the basis of the data of the operating condition of the selected operation mode which is read out from the memory means.

According to the GPS receiver having the above structure, a plurality of operating conditions for different operation modes are preset, and an operation mode suitable for the particular using condition of the GPS receiver is selected and then information based on the operating condition of the selected operation mode is displayed. Therefore, it is possible to display such various information in appropriate units and formats suitable for the particular using condition without changing any parameters of the operating condition even if the using condition of the receiver is changed during the navigation. Further, the change of the operation mode can be carried out only by operating the mode selection means without resetting any parameters, making it possible to carry out the change of the operation mode easily and reliably.

The at least two operation modes preferably include a first mode which is used on the sea or lake and a second mode which is used on the land. In this case, the operating condition of each operation mode has parameters including at least units for representing a distance, formats for representing a direction and formats for representing a position, and at least anyone of these three parameters of the operating condition of the first mode is different from the parameters of the operating condition of the second mode.

Further, the second mode may include an operation mode which is used in moving on the land by vehicle, another operation mode which is used in moving on the land by bicycle and the other operation mode which is used in moving on the land on foot. In this case, a parameter for determining a zone considered to be arrival at a destination within the operating condition of each operation mode of the second mode is different from each other.

Furthermore, it is preferred that the GPS receiver further includes a switch for turning ON or OFF a power source, in which the mode selection means is constituted such that the selection of the operation mode is performed by turning the switch ON from the OFF state under the condition that the operating section is being operated. As a result, because the switching operation between different modes must be carried out by operating several keys simultaneously, it is possible to prevent the kinds of misoperation that can occur by mistakenly operating the wrong key with a single key operation.

The other aspect of the present invention is directed to a GPS receiver for displaying information concerning a distance to a destination and a direction with respect to the destination and the like. The information is provided according to a preset operating condition on the basis of data which include position data of the destination which is set in advance and position data of the current position which is obtained from radio waves emitted from GPS satellites orbiting the earth. This GPS receiver comprises memory means which stores data of operating conditions corresponding to first, second, third and fourth operation modes, the parameters of the operating conditions of the four operation modes being different from each other in at least a part thereof; mode selection means for selecting either one of the operation modes suitable for the using condition of the GPS receiver; operating section for operating the mode selection means to read out the data of the operating condition of the selected operation mode; and display means for displaying various information including information relating to navigation on the basis of the data corresponding to the the operating condition of the selected operation mode which is selected by operating the operating section.

According to the GPS receiver, since it becomes unnecessary to preset a complex operating condition which was made in each time when the using condition of the receiver is changed in the conventional receivers, and it also becomes possible to immediately set the appropriate operating condition suitable for the actual using condition of the receiver, operability and reliability of the receiver are improved.

In this case, it is preferred that the first operation mode is used in boating on the sea or lake, and the second, third and fourth modes are used in moving on the land.

Other objects, features and functions of the present invention will be apparent when the following description of the preferred embodiment is taken in conjunction with the accompanying drawings.

BRIEF DESCRIPTION OF THE DRAWINGS

FIG. 3 is a table for explaining setup menus of operation modes according to the present invention;

DETAILED DESCRIPTION OF THE PREFERRED EMBODIMENTS

An embodiment of the present invention will now be described below with reference to FIGS. 1–5.

Figure 1:
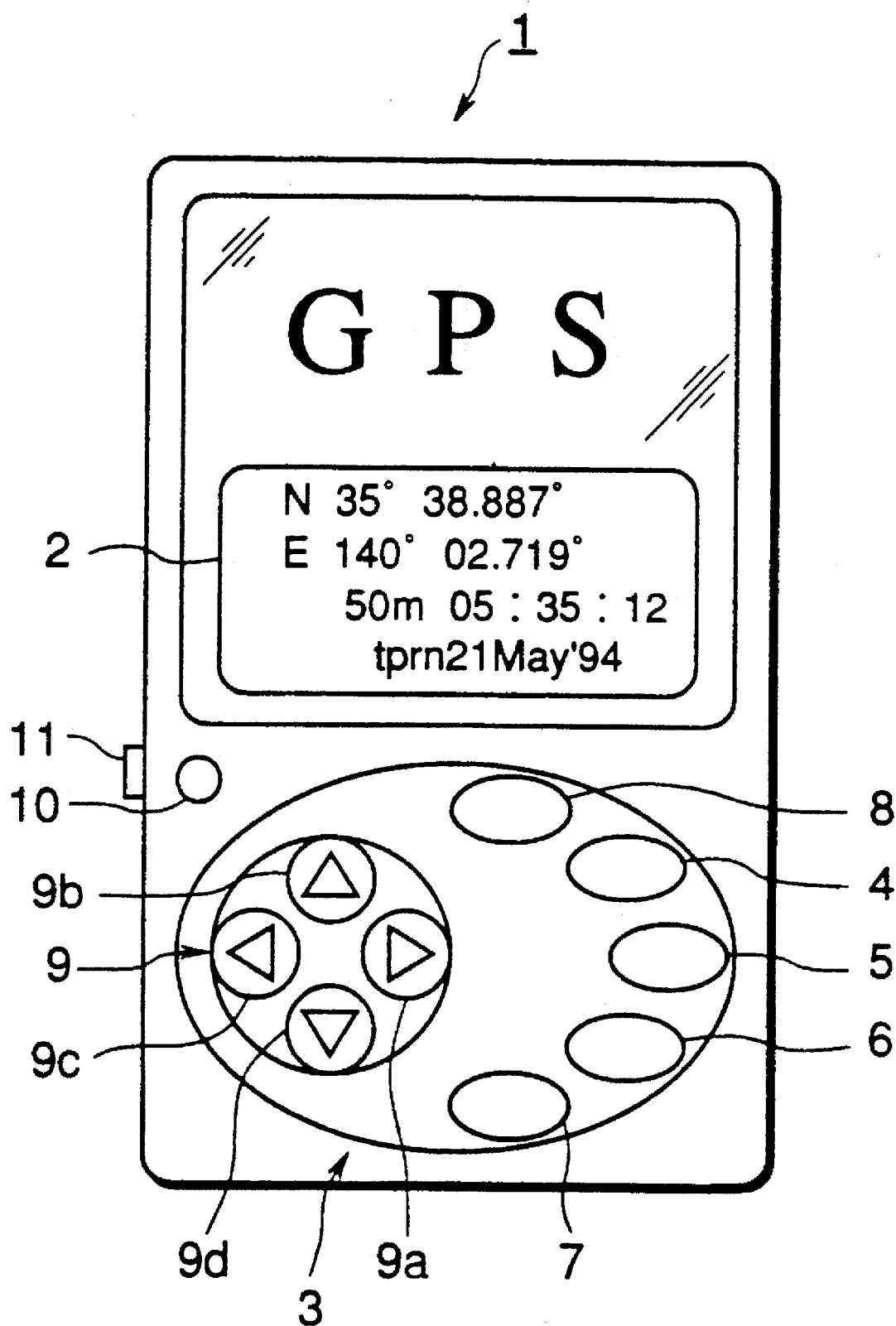
FIG. 1 is a top plan view of one embodiment of a GPS receiver according to the present invention.

FIG. 1 shows the external structure of an embodiment of a GPS receiver 1 according to the present invention. The GPS receiver 1 has a shape and size that enables it to be easily carried in one hand. Provided roughly in the middle of the top surface of the GPS receiver 1 is a display portion 2. The display portion 2 is formed from a liquid crystal display which is preferably capable of displaying four lines of sixteen characters.

Figure 2:
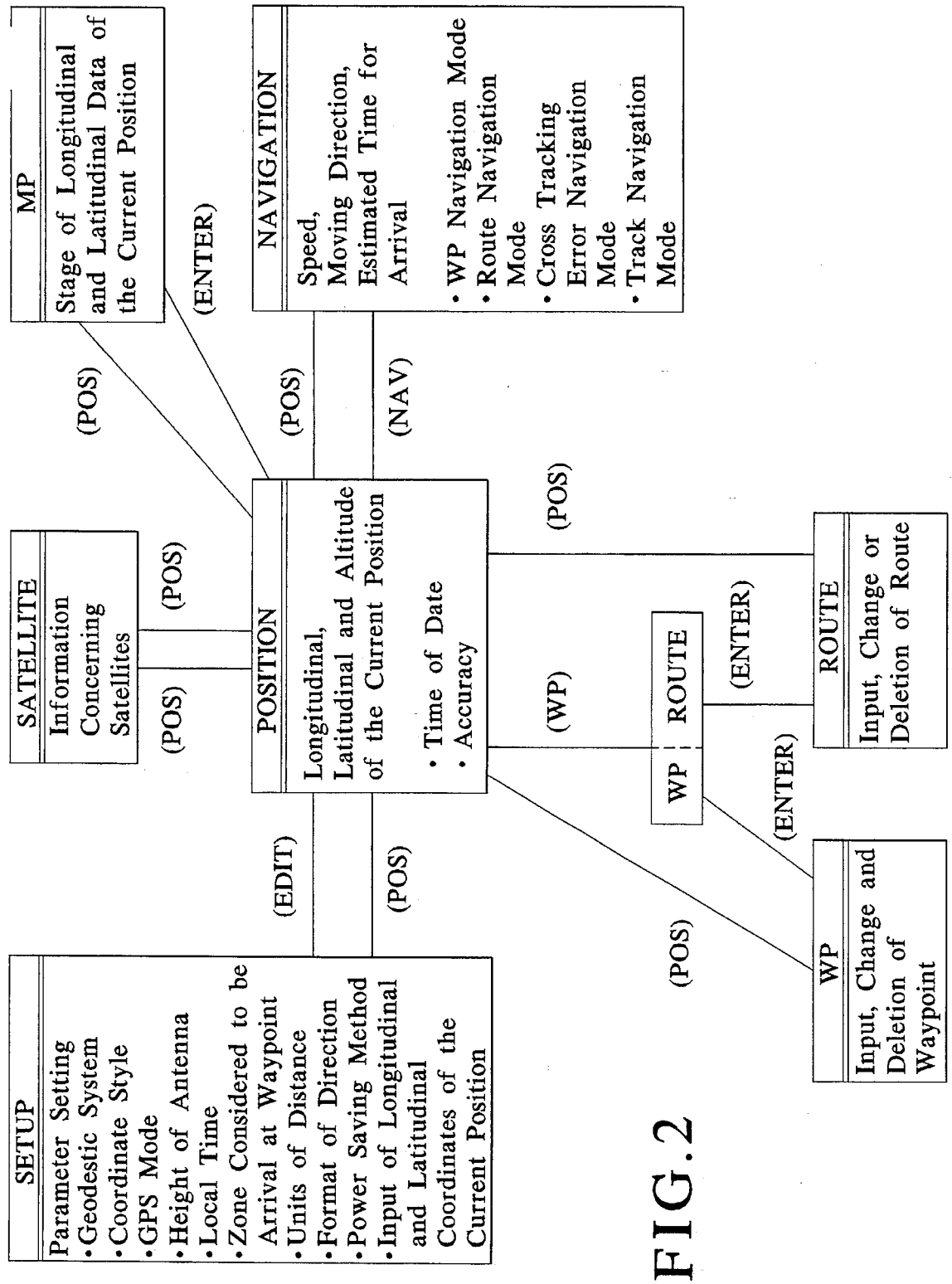
FIG. 2 is a chart for explaining contents to be displayed in a display portion of the GPS receiver according to the present invention.

As shown in FIG. 2, the display portion 2 is capable of displaying seven types of displays, namely position data display, setup menu display, satellite information display, waypoint data display, MP (Mark Point) data display, route data display and navigation data display. In each of these displays, the following information and items are displayed.

Position Data Display

The position data display displays the longitude, latitude and altitude coordinates of the current position. In this connection, the current position is determined automatically based on radio waves emitted from GPS satellites. Furthermore, the position data display also displays the time of day together with the accuracy of the measurement subjected by the distribution state of the satellites. Moreover, the position data display is set as the initial display. Therefore, when the power supply to the GPS receiver 1 is turned on, this position data display appears on the display portion 2.

Setup Menu Display

The setup menu display is a menu display in which various parameters of operating conditions, such as units for representing a distance and formats for representing a direction or the like according to each operation mode can be set in advance, as well as the longitude and latitude data of the current position.

In the present embodiment, there are five operation modes including a marine mode, a driving mode, a cycling mode, a mountain mode and a manual mode, and one of them can be selected. In these operation modes, the marine mode is used when the operator is traveling by boat or ship such as yachting and boating, the driving mode is used when the operator is traveling by vehicle such as an automobile, the cycling mode is used when the operator is traveling by bicycle, and the mountain mode is used when the operator is mountain climbing or hiking.

Furthermore, for each operation mode it is possible to preset such parameters as the geodesic system, the coordinate display style, the kind of GPS display mode, the antenna height, the local time setting, the zone considered to be arrival at the destination, the units for representing a distance, the formats for indicating direction, and method of power saving and the like. In this case, it is possible to constitute the receiver such that these parameters can be changed at the respective menu of each parameter in each operation mode as the need arises.

Here, it is to be mentioned that the parameter concerning the geodesic system is selected from seven previously recorded geodesic systems.

The coordinate display style means a display format for representing latitude and longitude coordinate data. In this parameter, the operator can select as to whether the latitude and longitude data is indicated in terms of minutes or seconds.

The GPS display mode means a format for representing a position. With regard to the parameter for this mode, the operator can select one display mode from a two dimensional position display mode, a three dimensional position display mode, or an automatic position display mode. In the case where the automatic position display mode is selected, position data is indicated in two or three dimensions depending on the state of radio waves received from GPS satellites. Now, in the case where there is no need for displaying an altitude data, such as when the altitude remains constant, for example when the GPS receiver is used on the sea or other body of water, a two dimensional display mode will be used in which only longitude and latitude coordinate data are displayed. Thus, as a result of the altitude having a fixed value, it is possible to achieve a higher accuracy in measuring positions.

Also, even in the case of high altitude lakes, the altitude has a fixed value. Therefore, it is possible to input such altitude information as the data representing the height of the antenna into the two dimensional display mode.

Furthermore, the parameter concerning the local time setting is provided for compensating difference in time between the local time and the Universal Time of Convention (UCT). In this parameter, the difference in time can be set in units of hours and minutes.

The parameter concerning the zone considered to be arrival at the destination can be set by selecting preset concrete numbers, such as 0.1, 0.5, and 1.0, that indicate the degree to which an operator has reached the extent of the destination.

The parameter concerning the units of distance, it is possible to choose between a nautical mile indication (Nautical (nm)), kilometer indication (Metric (km)) and a mile indication (English (ml)). The units that are set here are also used in the navigation display mode. For example, when the nautical mile indication (Nautical) is selected, distance is indicated in Nautical (nm), altitude is in feet (ft) and speed is in knots (nt). Further, when the kilometer indication (Metric) is selected, distance is indicated in kilometer (km), altitude is in meters (m) and speed is in kilometers per hour (km/h). Furthermore, when the mile indication (English) is selected, distance is indicated in miles (ml), altitude is in feet (ft) and speed is in miles per hour (mph).

The parameter concerning the direction display format can be set to either a north-south-west-east display format or an angular format in which direction is indicated in terms of the angular difference from a base direction. In this regard, the angular format is used for the marine mode and the north-south-west-east format is used for the other modes, namely the driving mode, the cycling mode and the mountain mode.

Furthermore, the power saver is a function that switches off the GPS receiver after a prescribed time has elapsed since the last operation was carried out after turning on the GPS receiver. In the menu for this parameter, it is possible for the operator to set the amount of time of inactivity that must elapse before the power saver switches off the GPS receiver.

Moreover, in this setup menu display, it is also possible to separately set the longitudinal and latitudinal coordinates of the starting position independent from the automatic setting function of the current position in the position data display. The reason why such a setting function is provided in case it requires too much time to set such information by utilizing the automatic setting function. Therefore, for example, in the case where long distances are traversed, by setting the starting position with this setup menu display, it is possible to reduce the time required for the position setting.

Satellite Information Display

In the satellite information display, various kinds of information relating to GPS satellites are displayed. In this display, the information of up to eight satellites can be displayed. The information that is displayed for each satellite includes indications which show the searching state, tracking state, data demodulation completion and satellites being in use for position measurement. Other displayed information includes PDOP information which shows the distribution state of the satellites from which radio waves are being received, normal satellite number information which shows the number of satellites that are normally in operation, and visible satellite information which shows the number of satellites that are visible from the current position.

Waypoint Data Display

The waypoint data display (WP) is a display in which an operator can set the destination and the waypoints to such destination by using the longitude and latitude coordinate data thereof. Further, in this display, the operator can also edit or delete the waypoints which have been set. In this connection, the longitude and latitude coordinate data of each waypoint are input one display at a time. Furthermore, it is possible to input and thereby assign a waypoint number for each of the waypoints and special characters identifying each of such waypoints.

MP (Mark Point) Data Display

The MP data display is a display for storing in a memory the current position as a waypoint. Namely, the longitude and latitude coordinate data of the current position is stored in memory together with the data representing the time of day. In this case, it is possible to assign a special character to the current position and store it in the memory together with such waypoint information.

Route Data Display

The route data display is a display in which routes for navigation can be set. Further, in this display, the routes which have been set can be changed or deleted. Stated concretely, such setting of routes is carried out by selecting from the plurality of waypoints stored in memory those waypoints which lie along a desired route and then ordering such selected waypoints in an appropriate sequence. Furthermore, the change or delete of the set routes is carried out by changing or deleting the waypoint numbers which have been entered.

Navigation Data Display

In the navigation data display, various kinds of information are displayed to guide or navigate an operator to the destination or waypoint along the route to the destination. Thus, by looking at the information displayed in this display, the operator can be guided to the destination or a waypoint to the destination.

The navigation data display has four types of display modes, namely a waypoint navigation mode, a route navigation mode, a cross tracking error navigation mode and a tracking navigation mode. Displayed in the waypoint navigation mode are the distance, direction, speed of motion, and direction of motion to the destination and the expected time of arrival at the destination. Furthermore, with the waypoint navigation mode, it is possible to specify a certain waypoint along a set route as a target waypoint. In addition, in this mode, by inputting an expected speed, it is possible to indicate the expected time to the target waypoint or the final waypoint. Moreover, in the cross tracking error navigation mode, a numerical value is displayed indicating the degree to which the current position is off from the set route together with the distance, direction, speed of motion and direction of motion to the waypoint. Furthermore, in the tracking navigation mode, the distance from the starting point to the current position is calculated and then indicated.

In this regard, it should be mentioned here that the types and contents of displays capable of being displayed on the display portion 2 are not limited to the displays described above. Also, it is possible to design the above described type GPS receivers so as to have other functions or display items that are provided in other commercially available GPS receivers.

Turning now back to the structure of the GPS receiver, provided in the vicinity of the display portion 2, preferably therebelow, is a keyboard section 3. The keyboard section 3 includes a navigation key 4 for switching from a position data display to a navigation data display, a waypoint key 5 for switching from a position data display to a waypoint data display or a route data display, and an edit key 6 for switching from a position data display to a setup menu display. Further, an enter key 7 is provided in the keyboard portion 3 for setting each parameter and storing the current position in memory in the MP data display. Also provided in the keyboard portion 3 is a position key 8 for returning the display from the other displays to the position data display which is set as the initial display.

Furthermore, a cursor key section 9 is provided for moving a cursor within the display portion 2. The cursor key section 9 includes an arrangement of a right cursor key 9a, an upper cursor key 9b, a left cursor key 9c and a bottom cursor key 9d. In this arrangement, when the right cursor key 9a is pushed, the position of the cursor in the display portion 2 moves to the right, and when the left cursor key 9c is pushed, the position of the cursor moves to the left by one character space.

In a similar manner, in the case where the cursor is outside a character entry region in the display portion 2, by pushing either the upper cursor key 9b or the bottom cursor key 9d, the cursor will be moved either up or down for one line. In this way, it is possible to carry out parameter selection. Furthermore, in the setup menu display, the upper cursor key 9b and the bottom cursor key 9d allow the menu for each parameter to be switched.

In the case where the position of the cursor in the display portion 2 lies within a character entry region, by pushing either the upper cursor key 9b or the bottom cursor key 9d, the alphanumeric character or the numeral displayed on the character entry region is changed in ascending or descending order. By performing these operations, it is possible to set the longitude and latitude coordinates, the waypoints and the waypoint numbers and the like.

Further, a light key 10 is provided on the top surface of the GPS receiver 1. When this light key 10 is pushed, the display portion 2 is lit from underneath. As a result, it becomes easy to read the characters, etc. that are displayed on the display portion when the GPS receiver is being used at night or in dark conditions.

Further, provided on a side surface of the GPS receiver 1 is a power switch 11. By operating the power switch 11, the GPS receiver 1 can alternately be turned ON or OFF.

Further, even though it has been omitted from the drawings, the GPS receiver 1 has an antenna that is preferably formed from ceramic or the like and which is housed within the main body of the GPS receiver 1.

Now, as was mentioned above, the GPS receiver's five separate operation modes are classified into a marine mode, a driving mode, a cycling mode, a mountain mode and a manual mode. Also, as shown in FIG. 8, with the exception of the manual mode, each of the other separate modes displays various kinds of data in accordance with the parameters of the operating condition which has been set so as to be appropriate to the purpose and use of each respective mode. As for the manual mode, it can be used to manually set any desired operating conditions.

Namely, as shown in FIG. 3, in the operating condition for the marine mode, coordinates are set in units of "minutes". Further, in this mode, since the GPS receiver is used on the sea, a two-dimensional GPS display mode is selected for displaying position. Furthermore, in the case where the GPS receiver is used on a lake or the like, the altitude is set as the height of the antenna. Moreover, distance is displayed in units of nautical miles. Furthermore, the zone considered to be arrival at the destination (waypoint) is set as "1 nautical mile", and the format for representing directions is indicated by the degree of angles.

Further, in the operating condition for the driving mode, coordinates are set in units of "seconds". And since the GPS receiver is used on the land where differences in altitude occur, an automatic display mode is selected for the GPS display mode, and so no setting of the antenna is carried out. Furthermore, the area considered to be arrival at the destination (waypoint) is set at "1 km".

Further, in the operating condition for the cycling mode, with the exception of the area considered to be arrival the destination (waypoint) being set at "0.5 km", the parameters are the same as those for the driving mode.

Further, in the operating condition for the mountain mode, with the exception of the area considered to be arrival at the destination (waypoint) being set at "0.1 km", the parameters are the same as those for the driving mode.

Moreover, as the need arises, it is possible to freely change any of the previously set parameters of the operating conditions described above. Furthermore, the parameters that do not need changing may be fixed in such a manner that they are not shown on the setup menu display. In this embodiment, the parameters, such as the "nautical mile" unit of distance in the marine mode and the "north-south-west-east" units of direction in the driving, cycling and mountain modes, are fixed as shown in FIG. 3. Further, in this embodiment, the coordinate display style for the marine mode and the GPS modes for the marine, driving, cycling and mountain modes parameter are also fixed.

Now, it should be mentioned here that the operation modes of the GPS receiver are not limited to the five modes described above. Other modes, such as a skysports mode for hang-gliding, hot air ballooning, etc. and a flight mode for traveling by aircraft, may be provided. Furthermore, the setting values of the parameters in the operating conditions of the operation modes may be different from the examples described above.

The operation modes described above are selected at the time the GPS receiver is turned on. For example, when the driving mode is to be selected, the GPS receiver 1 is first turned off, and then while pressing the edit key 6 and the left cursor key 9c at the same time, the power switch 11 1s switched on. By performing this operation, the driving mode is selected, and thereafter displays or indications of the GPS receiver 1 will be made according to the selected driving mode.

In this way, because the switching between different operation modes is carried out by operating several keys simultaneously, it is possible to prevent the kinds of misoperation that can occur by mistakenly operating the wrong key with a single key operation. Furthermore, when only the power switch 11 is switched to turn on the GPS receiver 1, the operation mode that was used immediately before reappears on the display portion 2 as the operation mode.

Under actual conditions, the GPS receiver having the above-described constructions and functions according to the present invention is used in a manner similar to that which follows. For example, the operator of the GPS receiver may travel by automobile to a harbor, take a ship from the harbor and go on an ocean voyage, return from the ocean voyage to the harbor, and travel once again by automobile. In this case, in Japan, the unit of distance would be in "km" while traveling by automobile and in "nm" while traveling by ship, and the unit of speed would be in "km/h" while traveling by automobile and in "nt" while traveling by ship. Therefore, the units of distance parameters of the operating conditions for the driving mode and the marine mode, "Metric" and "Nautical", are selected, respectively. As a result, distance is indicated in "km" and speed is indicated in "km/h" under the driving mode. On the other hand, distance is indicated in "nautical mile" and speed is indicated in "nt" under the marine mode. Now, in the U.S., the unit of distance while traveling by automobile would be in "ml", and accordingly the driving mode would use the "English" units of distance.

Figure 4:
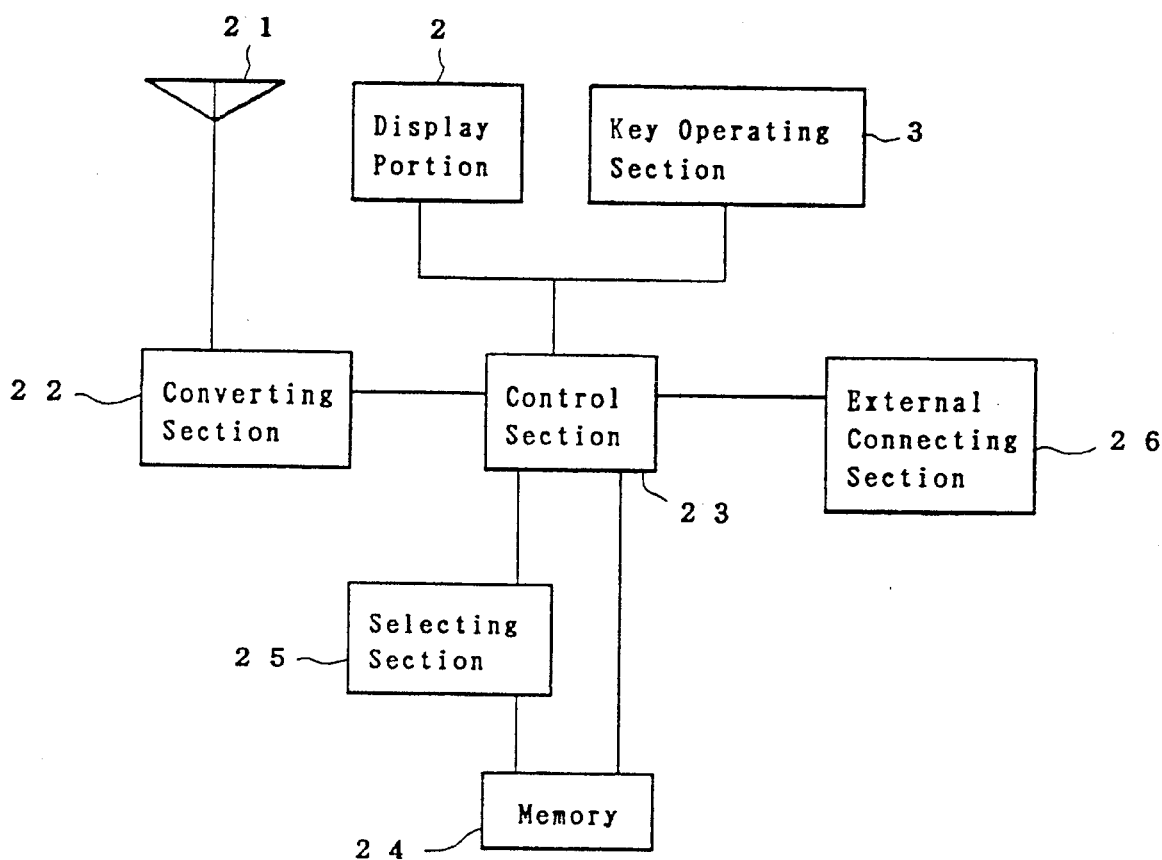
FIG. 4 is a block diagram which shows a whole structure of the GPS receiver according to the present invention.

Turning now to FIG. 4, the figure shows a circuit structure of the embodiment of the GPS receiver according to the present invention. Namely, by means of a GPS antenna 21, the GPS receiver is able to receive radio waves emitted from GPS satellites and to calculate and obtain data relating to the current position. Then, by means of a converting section 22, such data is converted into position data based on longitude and latitude. Then, the data output by the converting section 22 is sent to a control section 23. The control section 23 carries out control of each component of the receiver. Namely, the control section 23 sends output display data, such as menu information and the like, to the display portion 2, and the data which is sent to the display portion 2 is displayed on a liquid crystal display. Furthermore, based on information input by means of the keyboard section 3, the control section 23 sets the operating conditions, and the operating conditions which are set for each operation mode are stored in a memory 24. Also, by means of a selecting section 25, the control section 23 is able to retrieve from the memory 24 any operating condition data corresponding to the selected operation mode and then display such data on the display portion 2.

Furthermore, the control section 23 carries out control of an external connecting section 26. The connecting section 26 enables the GPS receiver to be connected to a marine plotter or personal computer via a connecting cord. Also, the data obtained with the GPS receiver can be used for game navigation. Further, it is also possible to collect and analyze such data.

Figure 5:
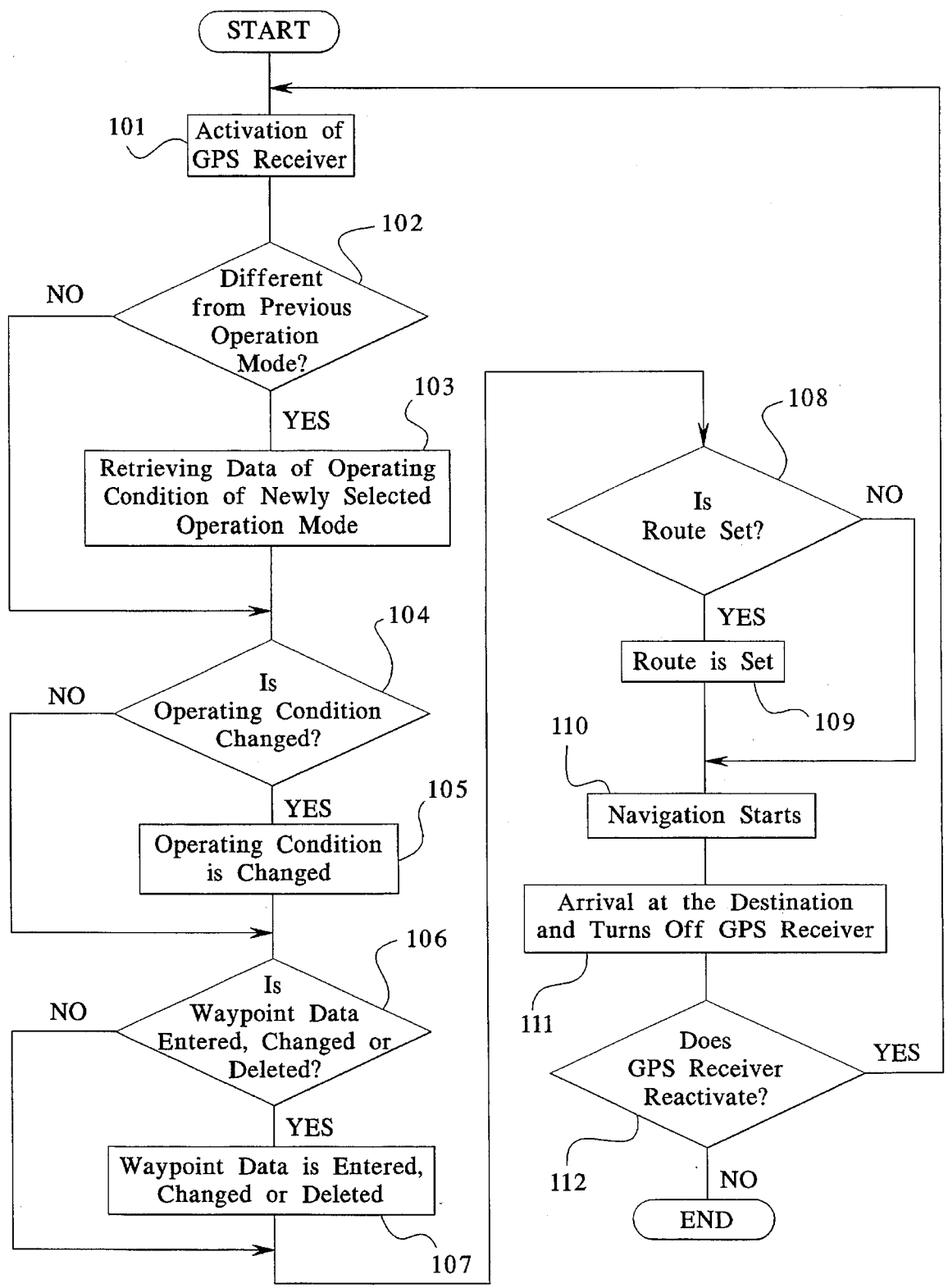
FIG. 5 is a flow chart which shows operation steps of the GPS receiver according to the present invention.

FIG. 5 is a flow chart illustrating an example operation sequence for the GPS receiver according to the present invention.

Namely, the operating conditions for each operation mode are set in advance, and the data thereof are stored in the memory 24 of the GPS receiver. Now, when the GPS receiver is to be used, first, the desired operation mode is selected, and the receiver is activated according to the operation mode (Step 101). Then, a determination is made as to whether or not the operation mode that is activated is the same as the previous operation mode that had been used immediately prior thereto (Step 102). In the case where the operation modes are the same, the sequence of operations moves to Step 104. However, in the case where the operation modes are different, the control section 23 of the GPS receiver retrieves from the memory 24 the data of the operating condition corresponding to the newly activated operation mode, and then the thus-retrieved operating condition data is used as the operating condition settings of the activated operation mode (Step 103). In this case, it should be noted that once the mode has been set, even if the power switch 11 is switched off, unless the GPS receiver is reset to one of the other operation modes, the operation mode will not change. Next, as it is not normally necessary to change the parameters of the operating condition, the operation sequence moves from Step 104 to Step 106. However, in the case where the antenna height and the local time at the destination, etc. need to be changed, changes may be made to the corresponding parameters of the operating condition as needed (Step 105). Next, in the case where the operator has already entered the position coordinates of the destination and waypoints to the destination, the operation sequence moves from Step 106 to Step 108. However, in the case where the position coordinates of the destination and waypoints have not yet been entered, or in the case where it is necessary to change the position coordinates, the position coordinates of the destination and waypoints may be entered, changed or deleted (Step 107). In this case, as was previously mentioned, any number of waypoints may be entered. Next, in the case where a route from the current position to a target destination has already been entered, or in the case where no such route needs to be entered, the operation sequence moves from Step 108 to Step 110. For example, in the case of the waypoint navigation mode, when one is navigating toward an independent waypoint, no route needs to be entered. However, in the case where a desired route has not been entered, a new route may be entered at this step. Further, at this step, as the need arises, a previously entered route may be changed or deleted (Step 109). A number of waypoints may be indicated along the route. Further, it is also possible to enter a number of routes.

By performing the above operations, the preparations needed for carrying out navigation with the GPS receiver are completed, and navigation may now be carried out (Step 110). When carrying out such navigation, as was previously explained for the display menus of the navigation display, the GPS receiver can be used to display a route navigation display, which shows the name of the waypoint to which the operator is headed along the set route as well as the time required for the travel, and a cross tracking navigation display, which shows how far off the operator is from the set route, and the like. In other words, the operator is guided to a waypoint or the destination according to the information displayed in the display portion 2 of the GPS receiver based on the selected operation mode. Then, after reaching a target waypoint, the GPS receiver is turned off (Step 111). In the case where the GPS receiver is to be used again, the operation sequence moves from Step 112 to Step 101 to reactivate the GPS receiver.

In this way, by previously setting the operating conditions for the different operation modes before navigation is carried out, even when the using condition of the GPS receiver changes while traveling, the GPS receiver can display necessary information with appropriate units and formats.

Finally, it should be noted that many changes and additions may be made to the embodiment described above without departing from the scope of the invention as defined by the appended claims.

What is claimed is:

1. A GPS receiver comprising:

memory means storing data of different operating conditions corresponding to a plurality of operation modes including at least first and second modes, said operating conditions comprising parameters including at least units for representing a distance using a nautical indication or a kilometer or mile indication in which the unit for representing a distance used in the operating condition of said first mode is different from that used in said second mode;

mode selection means for selecting an operation mode suitable for an actual using condition of the GPS receiver from said plurality of operation modes; and display means for displaying various information including information relating to navigation on the basis of the data of the operating condition of the selected operation mode which is read out from said memory means.

2. The GPS receiver as claimed in claim 1 further comprising:

an operating section for operating said mode selection means.

3. The GPS receiver as claimed in claim 1 wherein said first mode is an operation mode to be used on the sea or in a lake in which the nautical indication is used as an unit for representing a distance and said second mode is an operation mode to be used on land in which the kilometer or mile indicate is used as a unit for representing a distance.

4. The GPS receiver as claimed in claim 3 wherein said operating conditions further comprise a parameter concerning display formats for representing a direction using a north-south-west-east display format or an angular format in which the angular format is used in said first mode and the north-south-west-east display format is used in said second mode.

5. The GPS receiver as claimed in claim 3 wherein said operating conditions further comprise a parameter concerning display formats for representing latitude and longitude coordinate data using an indication in terms of minutes or seconds in which the indication in terms of minutes is used in said first mode and the indication in terms of seconds is used in said second mode.

6. The GPS receiver as claimed in claim 3 wherein said second mode includes a plurality of sub-modes comprised of a driving mode which is used in moving on land by a vehicle, a cycle mode which is used in moving on land by a bicycle, and a mountain mode which is used in moving on land on foot.

7. The GPS receiver as claimed in claim 7 wherein said operating conditions further comprise a parameter concerning display formats for representing a zone considered to be arrived at as the destination in which said display formats are different from each other between the respective sub-modes of said second mode.

8. The GPS receiver as claimed in claim 2 wherein the GPS receiver further comprises:

a switch for turning ON or OFF a power source in which said mode selection means is constituted such that the selection of the operation mode is performed by turning the switch ON from the OFF state under the condition that said operating section is being operated.

9. The GPS receiver as claimed in claim 2 wherein the GPS receiver further comprises:

a switch for turning ON or OFF a power source in which said mode selection means is constituted such that the operation mode which has been used immediately before turning the switch OFF is automatically selected when the switch is turned ON from the OFF state under the condition that said operating section is not operated.

* * * * *